United States Patent [19]
Codina et al.

[11] Patent Number: 5,880,681
[45] Date of Patent: Mar. 9, 1999

[54] APPARATUS FOR DETERMINING THE POSITION OF A WORK IMPLEMENT

[75] Inventors: George Codina, North Hollywood, Calif.; Thomas W. Herrick, Metamora; David J. Urbanc, Peoria, both of Ill.

[73] Assignee: Caterpillar Inc., Peoria, Ill.

[21] Appl. No.: 931,335

[22] Filed: Sep. 16, 1997

[51] Int. Cl.$^6$ .................................................. G01R 33/32
[52] U.S. Cl. .............................. 340/870.28; 340/870.26; 324/635
[58] Field of Search ................. 340/870.28, 870.26, 340/870.31; 324/635, 636, 207.16; 91/361

[56] References Cited

U.S. PATENT DOCUMENTS

| | | | |
|---|---|---|---|
| 4,737,705 | 4/1988 | Bitar | 324/635 |
| 4,757,745 | 7/1988 | Taplin | 91/361 |
| 5,233,355 | 8/1993 | Stefano | 341/187 |
| 5,241,278 | 8/1993 | Bitar | 324/635 |
| 5,331,319 | 7/1994 | Ebersohl | 340/870.28 |
| 5,438,261 | 8/1995 | Codina | 324/207.16 |
| 5,438,274 | 8/1995 | Bitar | 324/636 |
| 5,491,422 | 2/1996 | Bitar | 324/636 |
| 5,519,326 | 5/1996 | Bitar | 324/636 |
| 5,647,439 | 7/1997 | Burdick | 172/4.5 |
| 5,701,793 | 12/1997 | Gardner | 91/361 |

*Primary Examiner*—Michael Horabik
*Assistant Examiner*—Albert K. Wong
*Attorney, Agent, or Firm*—David M. Masterson

[57] ABSTRACT

An apparatus for determining the position of a work implement relative to an earthworking machine. An antenna is mounted to the machine and is oriented to transmit a high frequency signal toward the implement and receive a reflected signal back from the implement. An oscillator is electrically coupled to the antenna and energizes the antenna with electrical energy to generate the high frequency signal. The oscillator produces an output signal having a frequency responsive to the inductance of the antenna. A microprocessor based circuit receives the output signal of the oscillator and responsively determines the position of the work implement relative to the machine. The position of the work implement is a function of the frequency of the output signal.

8 Claims, 4 Drawing Sheets

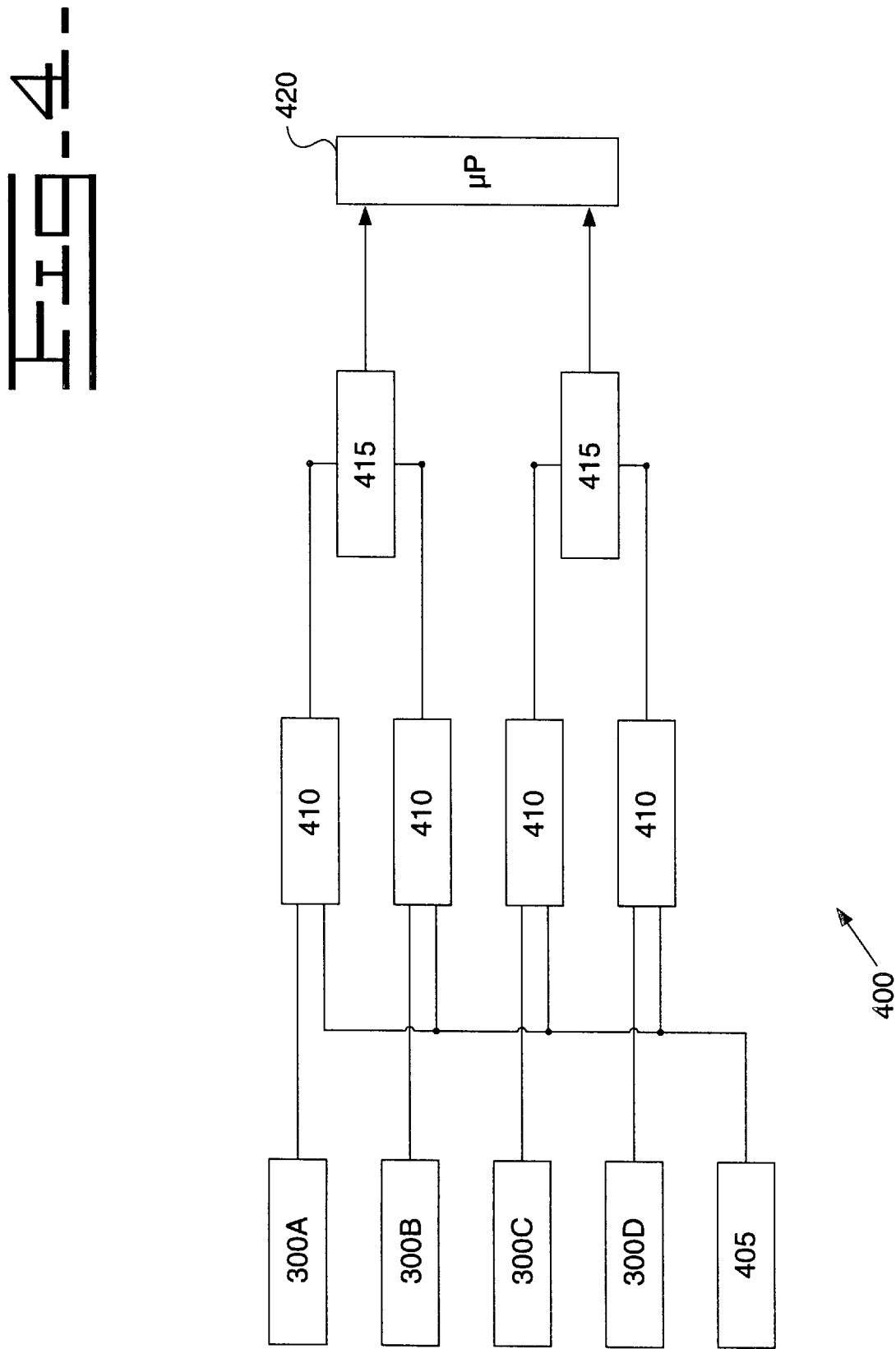

APPARATUS FOR DETERMINING THE POSITION OF A WORK IMPLEMENT

TECHNICAL FIELD

This invention relates generally to an apparatus for determining the position of a work implement using radar technology.

BACKGROUND ART

In the field of implement position sensing, a variety of systems have been proposed in which the movement of the implement is electrically sensed and displayed or used to perform control functions. Conventional transducers have serious deficiencies in detecting the movement of implements, owing in part to difficulties in mounting the transducers and the harsh environmental conditions to which they are exposed. Transducers used in the heavy equipment industry are particularly subject to damage from the severe work environment. Such heavy equipment work implements are typically located in relatively unprotected areas and are subject to; for example, high g-forces, wide temperature variations, dust, water, debris, etc., which can result in both electrical and mechanical failure.

One attempt to provide a sensor which is particularly suitable for the heavy equipment industry uses radio frequency (RF) signals. One such system is disclosed in U.S. Pat. No. 4,737,705 issued Apr. 12, 1988 to Bitar, et al. Bitar transmits a ramping RF signal into a coaxial resonant cavity formed by the hydraulic cylinder. When the cylinder's resonant frequency is transmitted, the signal detected by a receiving antenna reaches a peak. The resonant frequency has a one to one relationship with the cylinder's extension. Thus, by determining the cylinder's resonant frequency, the cylinder's linear extension can be determined. However, such a system is quite expensive and may not be considered to be cost effective for certain work sites.

The present invention is directed toward overcoming one or more of the problems as set forth above.

DISCLOSURE OF THE INVENTION

In one aspect of the present invention, an apparatus for determining the position of a work implement relative to an earthworking machine is disclosed. An antenna is mounted to the machine and is oriented to transmit a high frequency signal toward the implement and receive a reflected signal back from the implement. An oscillator is electrically coupled to the antenna and energizes the antenna with electrical energy to generate the high frequency signal. The oscillator produces an output signal having a frequency responsive to the inductance of the antenna. A microprocessor based circuit receives the output signal of the oscillator and responsively determines the position of the work implement relative to the machine. The position of the work implement is a function of the frequency of the output signal.

BRIEF DESCRIPTION OF THE DRAWINGS

For a better understanding of the present invention, reference may be made to the accompanying drawings in which:

FIG 4 illustrate a circuit used to measure the frequency of the oscillator circuit shown in FIG. 3.

BEST MODE FOR CARRYING OUT THE INVENTION

Figure 1:
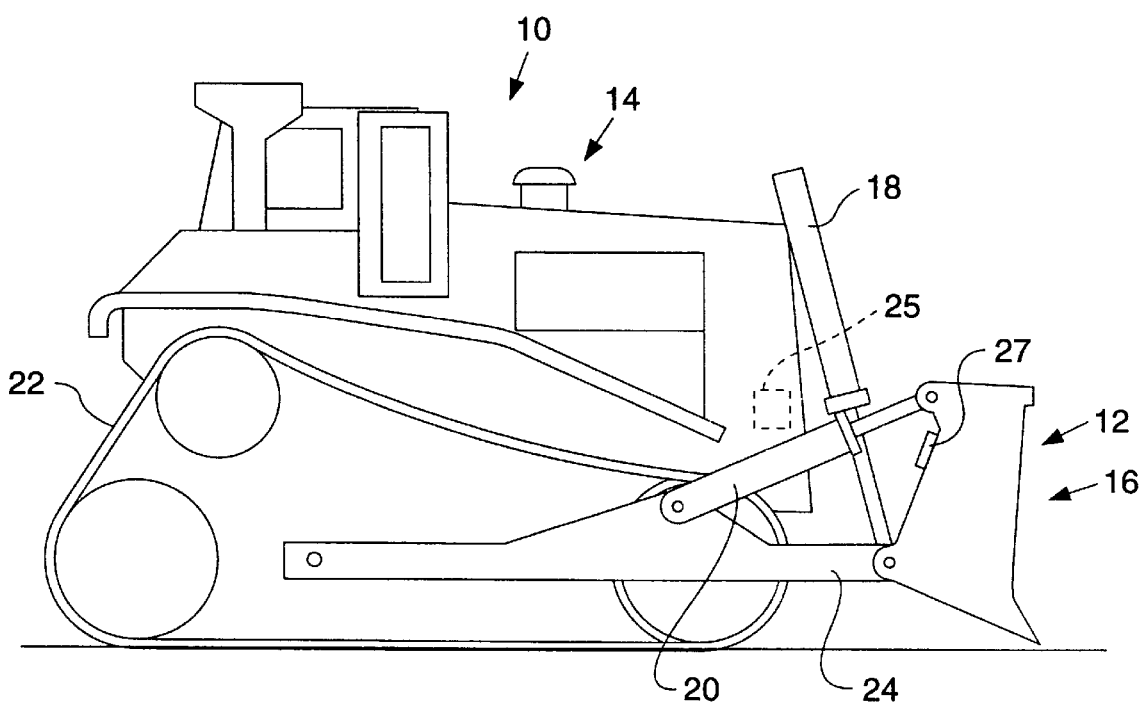
FIG. 1 illustrates a planar view of a bulldozer.

With reference to the drawings, FIG. 1 shows a planar view of an earthmoving machine 10 having a work implement 12. The work implement 12 is utilized to move earth or soil.

For illustrative purposes, the earthmoving machine 10 shown in FIG. 1 is a track-type bulldozer 14 and the earthmoving implement 12 is a bulldozer blade 16. While the invention is described using the bulldozer 14 and the bulldozer blade 16, it is intended that the invention also be used on other types of earthmoving machines 10 and earthmoving implements 12 such as loaders, excavators, front shovels, and the like. The bulldozer 14 includes hydraulic lift actuators 18 for raising and lowering the blade 16 and hydraulic tilt actuators 20 for tilting and tipping the blade. The bulldozer 14 also includes a set of tracks 22 and a draft arm 24 to push the blade 16. The present invention is directed toward determining the position of the blade 16. To accomplish this, the present invention employs an antenna array 25 that directs high frequency signals to a metal target plate 27 located on the back portion of the blade 16.

Figure 2:
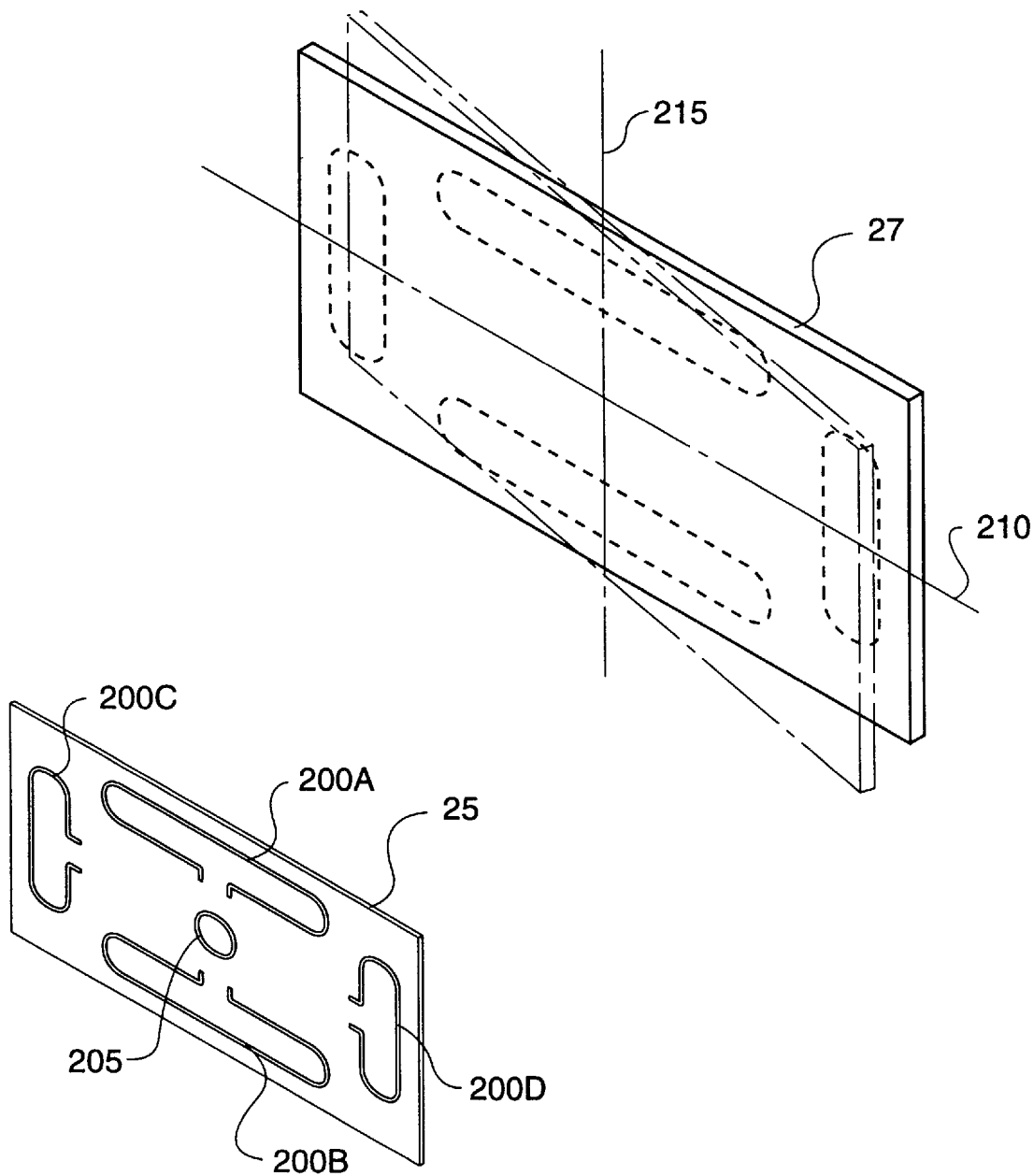
FIG. 2 illustrates an antenna array in relation to the blade of the bulldozer.

The present invention is more fully illustrated with reference to FIG. 2. In the preferred embodiment, an antenna array 25 including four antennas 200A–D are mounted in the front portion of the machine 10. Preferably, the antennas 200 are equally spaced apart and axially aligned with a vertical and horizontal axis 215,210. The antennas 200 are affixed on a plate 26 in a position to transmit high frequency signals to the target 27. Upon receiving the high frequency signals, the target 27 reflects the signals back to the antenna array 25. Preferably, the wavelengths of the transmitted signals are less than half the distance between the antenna array 25 and target 27. This provides for the target 27 to be electrically coupled to antenna array 25. For example, as shown by the dashed lines on the target 27, each energized antenna 200 induces a current mirror on the target 27 that electrically couples the respective portions of the target 27 to a respective antenna 200 of the antenna array 25. Consequently, each antenna 200 and the target portions (represented by the dashed lines) form an inductor whose inductance is responsive to the distance between the respective antenna 200 and the target portions. For example, the transmitted signals may be pulsed at a frequency ranging from 100 to 200 MHz. As will be explained below, each antenna 200 is used as an inductor in an oscillator circuit.

Antennas 200A,B form an antenna pair that corresponds to the top and bottom portions of the blade 16 and are used to detect distance changes in response to the blade 16 tilting about the horizontal axis 210. Antennas 200C,D form an antenna pair that correspond to the right and left portions of the blade 16 and are used to detect distance changes in response to the blade 16 tilting about a vertical axis 215.

Note, it may be preferable for the left and right antenna pair 200C,D to be of a smaller size than the top and bottom antenna pair 200A,B so as to operate in a higher frequency range. As the distance from each antenna 200 to the target 27 increases, the effective inductance of the effected antenna 200 decreases. The distance changes in the horizontal and vertical axis are used to determine the position of the blade 16, e.g., the elevation, pitch, roll and yaw of the blade 16. A smaller axially located circular antenna may also be used as a reference antenna 205.

The oscillator circuit will now be described in detail with reference to FIG. 3. As shown, the oscillator circuit 300 is constructed in a similar manner to that of a Colpitt's oscillator. The oscillator circuit 300 produces an output signal having a frequency that is a function of the inductance of the antenna 200. More particularly, the operating frequency of the output signal is described by the following equation:

$$\omega_0 = 2\pi f_0 = \frac{1}{\sqrt{L_{eq} * C_{eq}}}$$

where;

$$C_{eq} = \frac{C1*C2}{C1+C2} \text{, and}$$

$L_{eq}$ represents the inductance of the antenna 200.

The electronic circuitry 400 that is used to measure the frequency of the oscillator circuits 300 is shown in FIG. 4. A heterodyne mixer 410 receives an output signal from a respective oscillator circuit 300, as well as, a reference signal from a reference oscillator 405. The reference oscillator 405 is formed with the reference antenna 205 and produces a reference signal having a frequency responsive to the inductance of the reference antenna 205. Each heterodyne mixer 410 produces a mixing signal having a frequency equal to the difference between the output signal of the respective oscillator 300 and the reference signal. A digital comparator 415 is provided for each antenna pair 200A,B and 200C,D and receives the mixing signals from the respective heterodyne mixers 410 and produces a position signal having a magnitude equal to the difference in frequency between the mixing signals. Each position signal represents the change in blade position about the vertical and horizontal axis 210,215. The position signals are delivered to a microprocessor 420 which determines the position of the blade 16 relative to the bulldozer frame. For example, the microprocessor 420 inputs the magnitude of each position signal into a mathematical equation or a look-up table, and determines the blade position.

Figure 3:
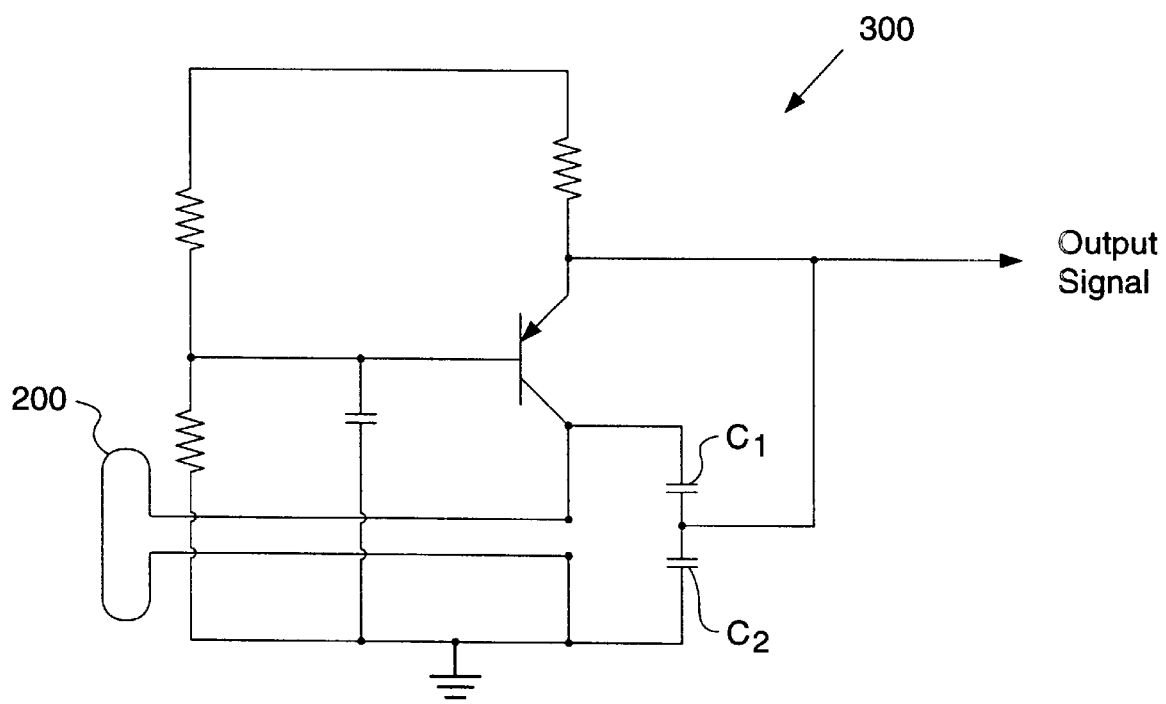
FIG. 3 illustrates an oscillator circuit used in conjunction with each antenna of the antenna array.

The circuits shown in FIG. 3 and 4 are exemplary, and the manner of design and construction of the circuit described, or similar circuits, would be commonly known to a person skilled in the art.

Thus, while the present invention has been particularly shown and described with reference to the preferred embodiment above, it will be understood by those skilled in the art that various additional embodiments may be contemplated without departing from the spirit and scope of the present invention.

Industrial Applicability

The present invention is directed toward determining the position of a work implement relative to an earthworking machine. Advantageously, the present invention employs an antenna array 25 that transmits high frequency signals to the back portion 27 of the work implement. The work implement reflects the high frequency signals back to the respective antennas 200 of the antenna array 25. As the position of the work implement changes, the distance between the back portion 27 of the work implement and the antenna array 25 changes, which causes the effective inductance of the antennas 200 to change. The inductance of the antennas 200A–D are monitored by electronic circuitry 400 that produce position signals that represent positional changes of the work implement. A microprocessor 420 receives the position signals and determines the position of the work implement relative of the machine.

Other aspects, objects and advantages of the present invention can be obtained from a study of the drawings, the disclosure and the appended claims.

We claim:

1. An apparatus for determining the position of a work implement relative to an earthworking machine, the implement being controllably mounted to the machine, comprising:

an antenna mounted to the machine and oriented to transmit a high frequency signal toward the implement and receive a reflected signal back from the implement;

an oscillator electrically coupled to the antenna and adapted to energize the antenna with electrical energy to generate the high frequency signal, the oscillator producing an output signal having a frequency responsive to the inductance of the antenna; and a circuit adapted to receive the output signal of the oscillator and responsively determine the position of the work implement relative to the machine, the position being a function of the frequency of the output signal.

2. An apparatus, as set forth in claim 1, including an antenna array comprising four antennas being mounted on a plate located on a front portion of the machine and directed to transmit high frequency signals to a target plate located on a back portion of the implement, the antenna array being electrically coupled to the target plate, wherein the inductance of each antenna is responsive to the distance between a respective antenna and the target plate.

3. An apparatus, as set forth in claim 2, wherein the four antennas include a pair of antennas being equally spaced apart and axially aligned with a vertical axis, and another pair of antennas being equally spaced apart and axially aligned with a horizontal axis that is perpendicular to the vertical axis.

4. An apparatus, as set forth in claim 3, including four oscillators, each oscillator being electrically coupled to a respective antenna.

5. An apparatus, as set forth in claim 4, including a circular antenna axially aligned with the junction formed by the horizontal and vertical axis, the circular antenna including a reference oscillator that produces a reference signal having a frequency responsive to the inductance of the circular antenna.

6. An apparatus, as set forth in claim 5, including four heterodyne mixers, each mixer being adapted to receive an output signal from a respective oscillator and a reference signal from the reference oscillator, and produce a mixing signal having a frequency equal to the difference between the output signal and the reference signal.

7. An apparatus, as set forth in claim 6, including a digital comparator provided for each antenna pair, each comparator receiving the respective mixing signals and producing a position signal having a magnitude equal to the difference in frequency between the respective mixing signals.

8. An apparatus, as set forth in claim 7, including a microprocessor being adapted to receive the position signals and determine the position of the work implement relative to the machine based on the position signal magnitude.

* * * * *